April 20, 1948. J. C. AUTEN 2,440,217
TRANSMISSION CONTROL MECHANISM
Original Filed April 4, 1945  2 Sheets—Sheet 1
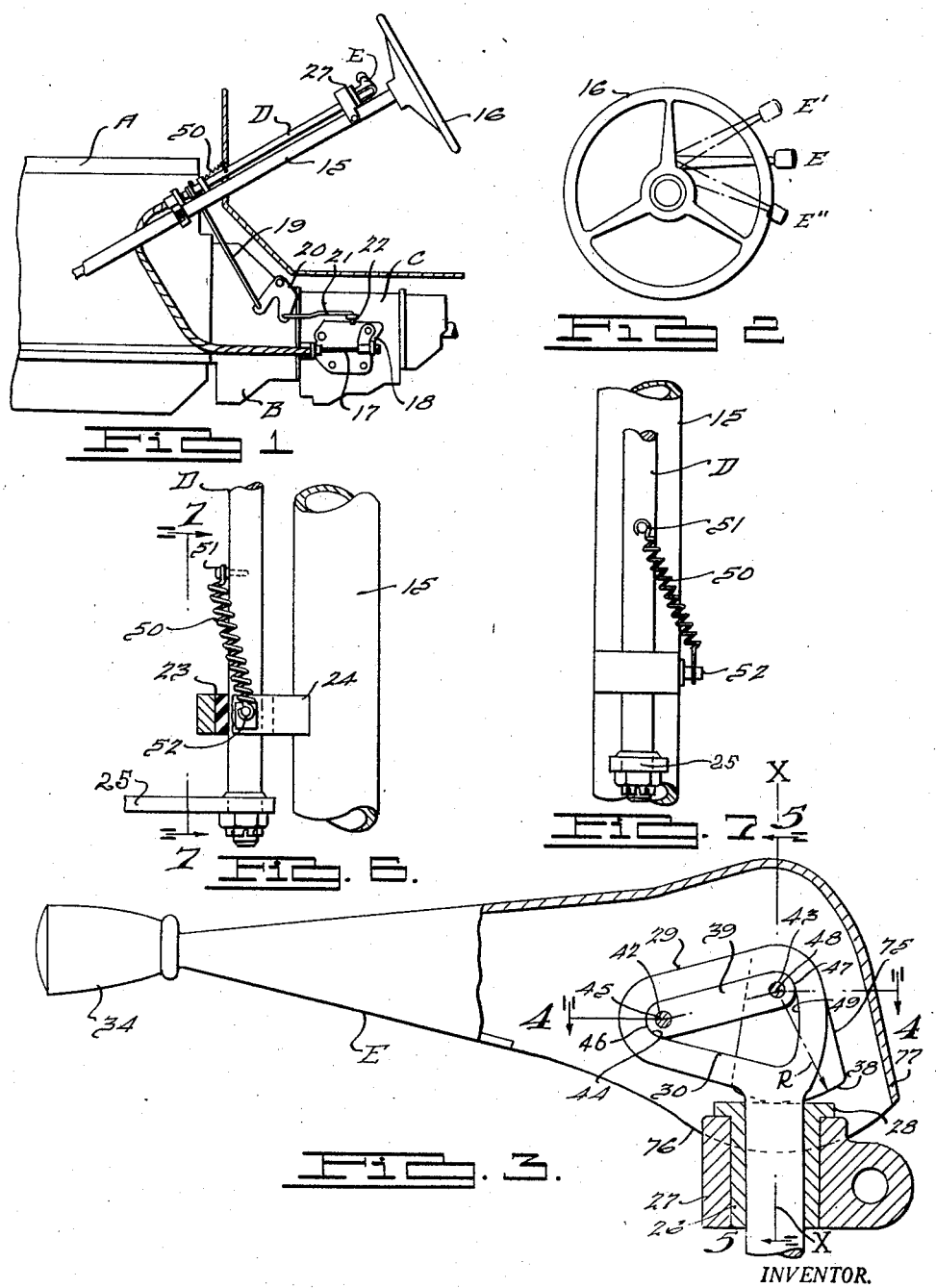
INVENTOR.
Jay C. Auten.
BY
Harness and Harris
ATTORNEYS.

April 20, 1948.  J. C. AUTEN  2,440,217
TRANSMISSION CONTROL MECHANISM
Original Filed April 4, 1945    2 Sheets-Sheet 2

INVENTOR.
Jay C. Auten.
BY
Harness and Harris
ATTORNEYS.

Patented Apr. 20, 1948

2,440,217

UNITED STATES PATENT OFFICE 2,440,217

TRANSMISSION CONTROL MECHANISM

Jay C. Auten, Royal Oak, Mich., assignor to Chrysler Corporation, Highland Park, Mich., a corporation of Delaware Original application April 4, 1945, Serial No. 586,498. Divided and this application February 21, 1946, Serial No. 649,196

4 Claims. (Cl. 74—484)

This invention relates to transmission control mechanism and refers more particularly to improvements in transmission remote shift mechanism especially adapted for mounting on motor vehicle steering posts.

This application is a division of my copending application Serial No. 586,498 filed April 4, 1945, now Patent No. 2,432,711, issued December 16, 1947.

It is an object of my invention to provide a control mechanism capable of being manufactured at lower cost than devices of this general type heretofore known.

Another object is to provide an easily manufactured control which is less likely to rattle than known devices and which will give better service and have longer life, also a control mechanism having improved characteristics of thrust application from the hand lever to the main steering post mounted selector operating control rod.

A further object is to provide rocker elements which may be manufactured separately from the shift lever and assembled therein.

Another object is to provide a control provided with rocker portions therein which are more substantial than known devices. The shift lever device described herein is adapted to be substantially fabricated from metal stampings, but the rocker cams are made of more substantial construction.

Further objects and advantages of my invention reside in the combination and arrangement of parts hereinafter described and claimed, reference being had to the accompanying drawings in which:

Fig. 1 is a side elevational view of a typical power plant and steering wheel installation for a motor vehicle showing my invention applied thereto;

Fig. 2 is a plan view of the steering wheel and driver operable shift lever as viewed by the vehicle driver;

Fig. 3 is a sectional elevational view through the shift lever and connection to the steering post mounted control rod;

Fig. 7 is a side elevational view of the Fig. 6 structure taken as indicated by line 7—7 of Fig. 6; and Fig. 8 is a view generally similar to Fig. 3 but illustrating a modification of my shift control mechanism.

Figure 5:
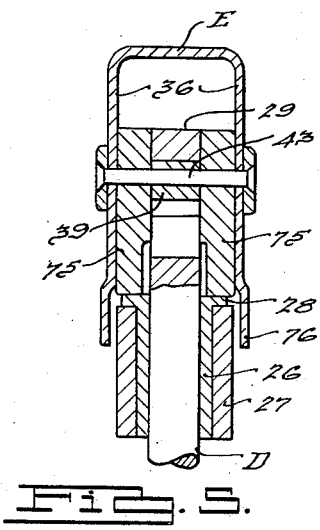
Fig. 5 is a sectional elevational view taken as indicated by line 5—5 of Fig. 3.
Figure 4:
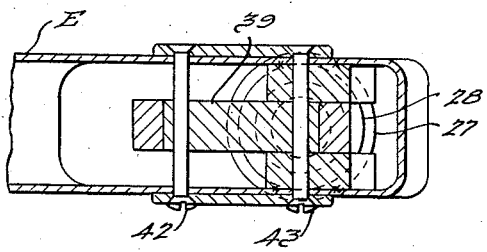
Fig. 4 is a detail sectional plan view taken as indicated by line 4—4 of Fig. 3.

In the drawings I have illustrated my invention in connection with a motor vehicle comprising the well known engine A, clutch B, and any type of transmission C which is adapted to be manipulated at least in part by the vehicle driver. In general, my invention provides improvements in the transmission control mechanism illustrated in the patents to F. W. Slack No. 2,291,111 of July 28, 1942, and O. E. Fishburn No. 2,284,191 of May 26, 1942, and may be employed to advantage in controlling the shift functions of various types of transmissions other than those illustrated in these patents.

My control mechanism is especially adapted for mounting on the conventional steering post 15 below the steering wheel 16, this steering post having its axis inclined forwardly and downwardly from the steering wheel. A main control rod D extends longitudinally adjacent the post 15 and is adapted to select and operate the transmission control elements for forward and reverse speed ratio drives as in the transmissions of the aforesaid patents, for example. When rod D is adjusted from a neutral position in the direction of its axis, such motion is transmitted through any suitable operating connection, such as through the Bowden wire 17, to the transmission selector lever 18. When rod D is rotated about its axis such motion is transmitted through any suitable operating connection, such as through the link and lever system 19, 20, 21, to the transmission lever 22 thereby to operate the transmission speed ratio control element which has been selected by longitudinal movement of rod D.

Figure 6:
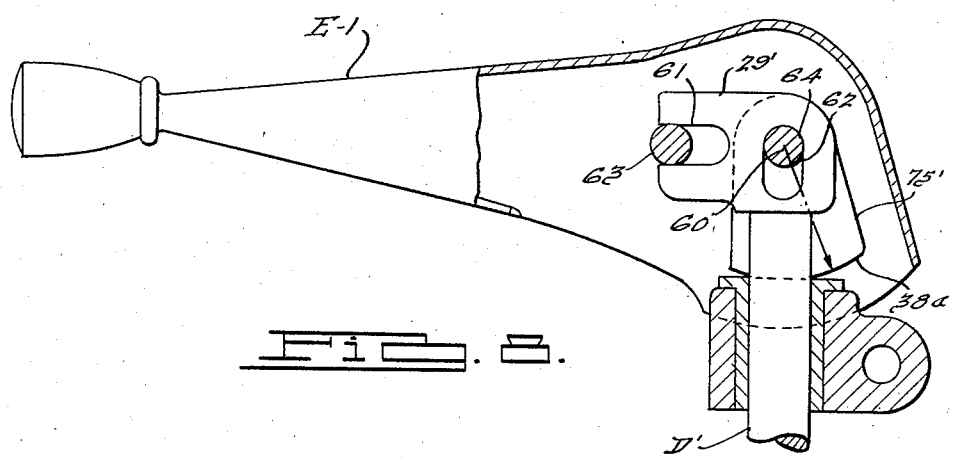
Fig. 6 is an enlarged elevational view illustrating the biasing means for the shift mechanism as viewed in Fig. 1.

Rod D may be suitably guided adjacent its lower end to accommodate its rotary and longitudinal movements as in the yielding bushing 23 (Fig. 6) carried by bracket 24 rigidly mounted on post 15. Rod D may be assembled downwardly in its bushing mountings, a lever 25 being thereafter fixed to the rod for operating link 19. Adjacent its upper end rod D is guided by a bushing 26 which is fixed in a bracket 27 which in turn is fixed to post 15. In Fig. 3 the bushing 26 has a press fit in bracket 27, this bushing having an annular flange 28 at its upper end resting on the upper face of the bracket. As will presently be apparent, the bushing 26 serves as a fixed fulcrum support for the shift lever on the post 15.

At its upper end rod D is formed with a flattened laterally elongated lever-forming head portion 29 slotted at 30 to receive a lever operating and guide means. A shift lever E comprises a hollow steel stamping terminating outwardly in a handle or knob 34 adapted to be grasped by the driver in manipulating lever E. Lever E carries fulcruming lever rockers 38. These rockers 38 are formed on elements 75 secured as by welding to the inner faces of side walls 36, the upper ends of these elements serving as spacers to receive the relatively narrow head 29 therebetween and prevent undesired lateral movement of the lever relative to rod D. The rockers 38 of elements 75 are arced on radius R about centering axis 48. Lever E swings upwardly about axis 48 and laterally about axis X—X.

Some of the features of the device illustrated in Fig. 3 are described and claimed in my copending application Serial No. 586,498.

The lever side walls are skirted downwardly at 76 as is also the end wall at 77 to partially enclose the bushing 26 and flange 28 thus keeping dirt away from these parts, protecting the operating parts from accidental contact by the operator who may otherwise be injured, and to generally enhance the appearance of the control.

I have provided means supported between the depending side walls of lever E and cooperating with the slotted formation of the lever head 29 for effecting lift of the rod D in response to lift of lever handle 34 and also for maintaining lever E positioned against undesired displacement in the direction of its length transversely to the axis X—X, this means cooperating with the rockers 38 and fulcrum bushing 26 to guide up and down shifting movements of lever E. In Fig. 3 this means comprises a plate 39 extending between the rockers 38 by fasteners 42 and 43.

Plate 39 extends through slot 30 which is generally triangular in shape having its apex of cylindrical contour at 44 centered about an axis 45 to rotatably fit the cylindrical end 46 of plate 39. The other end of the plate is likewise cylindrically formed at 47 about an axis 48 for engagement with the base 49 of the slot 30, this being of arcuate formation centered on axis 45.

In the Fig. 3 position of the parts with the lever E in its lowermost neutral position the upper face of plate 39 engages the upper wall or side of the triangular slot 30 and when the lever is fully swingingly raised then the lower face of plate 39 engages the lower wall or side of slot 30, the plane containing the parallel axes 45 and 48 thus sweeping through an angle approximately bisected by a plane normal to axis X—X and containing axis 48. Thus, by preference, the plate 39 is initially downwardly and outwardly inclined so that in lifting lever E the axis 45 moves substantially vertically in applying its lift to rod D with a minimum of side thrust on the rod D. However, if desired, the plate 39 may have an initial position horizontally or at some other inclination.

The rockers 38 are preferably of arcuate formation on a radius R about the axis 48 and this axis preferably intersects axis X—X or lies closely adjacent thereto in order to cause lever E to swing vertically about the axis of rod D without undue side thrust thereon and in order to maintain a fixed distance R between the lever axis 48 and the fulcrum surface at 28. With such an arrangement the axis 48 neither rises nor falls for vertical shifts of lever E and, therefore, neither gains nor loses effective lift on the rod D. Of course by curving rockers 38 about an axis either above or below that illustrated at 48, the effective lift of lever E will be either supplemented by increased lift or decreased lift as the case may be. Furthermore, rockers 38 could be of non-uniform curvature for camming lift if desired.

During upward swing of lever E, the lever axis of rotation 48 has an imperceptible displacement laterally of axis X—X as the plate 39 moves perpendicular to axis X—X and the lever is free to so move by slight slip at the fulcrum support 28 as will presently be apparent.

In order to minimize friction between the fixed fulcrum bushing 26 and the lever rockers 38 slidably seated thereon and to provide for an easy noiseless shift of lever E both vertically and horizontally or laterally, I preferably form the bushing, or its lever supporting face, of some metal composition different from that of the lever flanges. Thus in Fig. 3 the bushing 26 is formed by molding and sintering powdered metal or metals of different melting points in a manner now well known in forming porous metal bearings of the self-lubricating type as, by way of example, set forth in patent to C. A. Tea 1,927,619 of September 19, 1933, and to W. G. Calkins et al. 1,927,627 of September 19, 1933. Lubricant may be provided in the form of graphite included in the metal mixture supplemented by or substituted by fluid lubricant absorbed by immersing the bushing in lubricating oil then to be exuded to the fulcrum surface of bushing flange 28. Reference may be made to my copending application Serial No. 649,197, now Patent No. 2,436,186, issued February 17, 1948, which describes and claims this feature.

Following present known arrangements in remote gearshift mechanisms in general use, rod D is preferably biased downwardly at some convenient point or points in the connections of the operating system, usually within the transmission C. This serves to maintain lever E in its Fig. 3 neutral downwardly swung position known as the high speed range ready to be rotated forwardly about axis X—X to the position E' in Fig. 2 for forward transmission drive setting or rearward to E'' for forward drive in high. Lever E is lifted in neutral and then moved forward about axis X—X for reverse, or rearward for forward drive in low, this latter position being omitted in some well-known shift arrangements especially where the manual shifts are supplemented by automatic shift functions in the transmission.

Because of the inclination of post 15 and rod D, and the mass of lever E, the lever when in the forward position E' has a tendency to work back to neutral especially when driving the car over rough roads. In order to offset this tendency and to also bias the lever E downwardly, I have provided a coil spring 50 (Figs. 6 and 7) having its upper end secured at 51 to rod D. The lower end of this spring is secured at 52 to bracket 24 and is displaced rotatably about axis X—X relative to the end at 51 in a direction tending to bias lever E forwardly from its neutral position, the displacement being such that with the lever shifted to the position E' the spring 50 will act to counterbalance and offset the tendency of the lever to jiggle out of the position E'. At the same time spring 50 exerts a constant downward pull on rod D so that lever E is maintained seated on bushing 26 and to maintain an anti-rattle connection between rod D and lever E. This spring device has been described and claimed in my copending application Serial No. 649,194.

With lever E in its Fig. 3 neutral position, rod D is biased downward causing head 29 to seat on the upper face of plate 39 thereby forcing the lever E to seat at its rockers 38 on the bushing flange 28 stationarily mounted on the post 15. Rotation of lever E either fore or aft will cause the lever and rod D to rotate as a unit about axis X—X, head 29 fitting the rocker elements 75 affixed to the side walls of lever E. During this movement rockers 38 rotatably slidably bear on the bushing flange 28. The lubricant content of the bushing 26 insures the desired freedom of sliding contact at rockers 38 free from noise and undue wear.

When lever E is lifted from the Fig. 3 neutral position, preparatory for a rotational shift in the raised position, rockers 38 wipe across flange 28 at the bushing contact substantially in a plane transversely to the shift lever through axis X—X or closely adjacent thereto as in Fig. 3 while the plate portion at 46 lifts the head 29. During this lift, the lever E rotates about axis 48 in providing a mechanical advantage for lifting rod D in the ratio of the effective lengths of lever E and plate 39 from axis X—X. After the lever has been lifted then it is swung about axis X—X. The wiping and rotating movements of rockers 38 on flange 28 brings into action at different times the various portions of rockers 38 with the various portions of flange 28 so that there is no tendency to wear a groove in the fulcrum surface of flange 28.

A modified form of my invention is illustrated in Fig. 8. Certain features of this device illustrated in Fig. 8 are described and claimed in my copending application Serial No. 649,193, now Patent No. 2,432,710 issued December 16, 1947. Rod D' now has an enlarged lever head 29' slotted at 61, 62. The slot 61 opens outwardly at the lever portion of head 29' and slidably receives the operating pin 63 anchored across the lever side walls. The slot 62 is vertically elongated to slidably receive a second similar pin 64, which serves to hold the lever E—1 in position lengthwise thereof and at the same time allows the head 29' to be displaced upwardly within the lever E—1 when the latter is lifted to effect the selecting axial shift of rod D'. When lever E—1 is lifted for the cross-over transmission selection, the pin 63 lifts the rod D' at the slotted lever portion of head 29'. When rod D' is thus lifted about axis 60, it is rotated by swinging lever E—1 about axis X—X.

In Fig. 8 the rockers 38ᵃ are carried rigidly by the shift lever by reason of their being formed on the spacer members 75' welded to the lever side walls in a manner similar to members 75 of Fig. 3.

I claim:

1. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, means for mounting said rod on said steering column comprising a member fixed relative to the steering column and having an annular fulcrum surface surrounding said rod adjacent said lever opening, means connecting the upper end of said rod with said shift lever for transmitting vertical swinging movements of said shift lever to said rod so as to move said rod in the direction of its axis and for guiding said shift lever for rotational shift about said rod axis during said rotary shifting movements of said shift lever, a pair of spacers respectively rigidly attached to the inner side walls of said shift lever for receiving the offset lever portion of said rod therebetween and each spacer being provided with a lever-fulcruming rocker engaging said annular surface, said rockers extending generally longitudinally of said shift lever along and adjacent opposite sides of said rod and each rocker having at least a portion thereof arced about an axis extending in a direction transverse to said rod axis, said mounting and connecting means cooperating with said rockers such that when said shift lever is rotatably shifted about said rod axis the said rockers rotatably wipe said annular friction surface and such that when said shift lever is swung vertically upwardly said rockers slidably wipe said annular friction surface and fulcrum said shift lever for effecting lift of said rod.

2. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, means for mounting said rod on said steering column comprising a member fixed relative to the steering column and having an annular fulcrum surface surrounding said rod adjacent said lever opening, means connecting the upper end of said rod with said shift lever for transmitting vertical swinging movements of said shift lever to said rod so as to move said rod in the direction of its axis and for guiding said shift lever for rotational shift about said rod axis during said rotary shifting movements of said shift lever, a pair of spacers respectively rigidly attached to the inner side walls of said shift lever for receiving the offset lever portion of said rod therebetween and each spacer being provided with a lever-fulcruming rocker engaging said annular surface, said rockers extending generally longitudinally of said shift lever along and adjacent opposite sides of said rod and each rocker extending in a direction transverse to said rod axis, said mounting and connecting means cooperating with said rockers such that when said shift lever is rotatably shifted about said rod axis the said rockers rotatably wipe said annular friction surface and such that when said shift lever is swung vertically upwardly said rockers slidably wipe said annular friction surface and fulcrum said shift lever for effecting lift of said rod, the inner side walls of said shift lever extend downwardly below said rockers and said annular fulcrum surface.

3. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said rod lever portion having a generally triangularly shaped opening formed therein and so arranged that its base extends in the general direction of said rod axis and its apex lies adjacent the offset end of said rod lever portion, means carried by said shift lever and extending transversely of said hollow portion through said opening in engaging association with said base and apex portions of said opening for providing an operable connection between said rod and shift lever, a pair of spacers respectively rigidly attached to the inner side walls of said shift lever for receiving the offset lever portion of said rod therebetween and each spacer being provided with a lever-fulcruming rocker engaging said annular surface, said rockers extending generally longitudinally of said shift lever along and adjacent opposite sides of said rod and each rocker having at least a portion thereof arced about an axis extending in a direction transverse to said rod axis, said mounting and connecting means cooperating with said rockers such that when said shift lever is rotatably shifted about said rod axis the said rockers rotatably wipe said annular friction surface and such that when said shift lever is swung vertically upwardly said rockers slidably wipe said annular friction surface and fulcrum said shift lever for effecting lift of said rod.

4. In a steering column mounted control mechanism for selectively operating speed ratio controls of a motor vehicle transmission, a main rotatable and reciprocatory control rod having its axis extending generally longitudinally of the steering column and adapted for operative connection with the transmission, said rod having its upper end provided with a lever portion rigidly connected to said rod and offset laterally therefrom, a shift lever having an outer end portion adapted to be grasped by the vehicle driver and a hollow inner end portion within which said offset lever portion is disposed thereby housing said lever portion within said hollow end portion and providing an operative connection between said shift lever and said offset lever portion such that rotary shifting movements of said shift lever about said rod axis cause said rod to rotate about said axis with said shift lever, said hollow end portion of the shift lever having an opening through which said rod extends, said lever portion of said rod being slotted to provide pin-engaging walls carried by said lever portion, a pair of pins carried by said shift lever and extending transversely of said hollow portion in engagement with said walls of said lever portion of said rod for providing an operable connection between said rod and shift lever, a pair of spacers respectively rigidly attached to the inner side walls of said shift lever for receiving the offset lever portion of said rod therebetween and each spacer being provided with a lever-fulcruming rocker engaging said annular surface, said rockers extending generally longitudinally of said shift lever along and adjacent opposite sides of said rod and each rocker having at least a portion thereof arced about an axis extending in a direction transverse to said rod axis, said mounting and connecting means cooperating with said rockers such that when said shift lever is rotatably shifted about said rod axis the said rockers rotatably wipe said annular friction surface and such that when said shift lever is swung vertically upwardly said rockers slidably wipe said annular friction surface and fulcrum said shift lever for effecting lift of said rod.

JAY C. AUTEN.

REFERENCES CITED

The following references are of record in the file of this patent:

UNITED STATES PATENTS

| Number | Name | Date |
| --- | --- | --- |
| 2,182,252 | Dolza et al. | Dec. 5, 1939 |
| 2,235,975 | Best | Mar. 25, 1941 |
| 2,303,787 | Burd | Dec. 1, 1942 |